US012561115B2

(12) United States Patent (10) Patent No.: US 12,561,115 B2
Liu et al. (45) Date of Patent: Feb. 24, 2026

(54) COMPUTING APPARATUS AND METHOD, BOARD CARD, AND COMPUTER READABLE STORAGE MEDIUM

(71) Applicant: ANHUI CAMBRICON INFORMATION TECHNOLOGY CO., LTD, Anhui (CN)

(72) Inventors: Shaoli Liu, Anhui (CN); Daofu Liu, Anhui (CN); Shiyi Zhou, Anhui (CN)

(73) Assignee: ANHUI CAMBRICON INFORMATION TECHNOLOGY CO., LTD, Hefei (CN)

( * ) Notice: Subject to any disclaimer, the term of this patent is extended or adjusted under 35 U.S.C. 154(b) by 1042 days.

(21) Appl. No.: 17/556,389

(22) Filed: Dec. 20, 2021

(65) Prior Publication Data

US 2022/0188071 A1 Jun. 16, 2022

Related U.S. Application Data

(63) Continuation of application No. PCT/CN2021/081189, filed on Mar. 16, 2021.

(30) Foreign Application Priority Data

Mar. 17, 2020 (CN) .......................... 202010188335.6

(51) Int. Cl.
G06F 7/76 (2006.01)
G06F 7/38 (2006.01)
G06F 7/48 (2006.01)

(52) U.S. Cl.
CPC .................. *G06F 7/76* (2013.01); *G06F 7/38* (2013.01); *G06F 7/4824* (2013.01)

(58) Field of Classification Search
CPC .................................... G06F 7/762; G06F 7/76

(Continued)

(56) References Cited

U.S. PATENT DOCUMENTS

| 5,052,043 A | 9/1991 | Gaborski |
| 6,144,977 A | 11/2000 | Giangarra et al. |
(Continued)

FOREIGN PATENT DOCUMENTS

| CN | H09-265379 A | 10/1997 |
| CN | 1503858 A | 6/2004 |
(Continued)

OTHER PUBLICATIONS

Hennessy, J. L, et al., Computer Architecture: A Quantitative Approach, Morgan Kaufmann (an imprint of Elsevier), 5th Edition. ( Year: 2012).*

(Continued)

*Primary Examiner* — Nicholas Klicos
*Assistant Examiner* — Jonathan David Warner
(74) *Attorney, Agent, or Firm* — Rimon PC

(57) ABSTRACT

The present disclosure relates to a computing device for processing a multi-bit width value, an integrated circuit board card, a method, and a computer readable storage medium. The computing device may be included in a combined processing apparatus, and the combined processing apparatus may further include a general interconnection interface, and an other processing device. The computing device interacts with the other processing device to jointly complete a computing operation specified by a user. The combined processing apparatus may further include a storage device connected to an apparatus and the other processing device and configured to store data of the apparatus and the other processing device. The solution of the present disclosure can split the multi-bit width value so that the processing capability of the processor is not influenced by the bit width.

16 Claims, 4 Drawing Sheets

(58) Field of Classification Search
USPC .......................................................... 708/204
See application file for complete search history.

(56) References Cited

U.S. PATENT DOCUMENTS

| | | | |
|---|---|---|---|
| 6,510,446 | B1 * | 1/2003 | Fukagawa ............... H03M 7/24 |
| | | | 708/204 |
| 6,671,796 | B1 | 12/2003 | Sudharsanan et al. |
| 6,715,065 | B1 | 3/2004 | Ebata et al. |
| 6,931,639 | B1 | 8/2005 | Eickemeyer |
| 7,236,995 | B2 | 6/2007 | Hinds |
| 7,242,414 | B1 | 7/2007 | Thekkath et al. |
| 7,406,451 | B2 | 7/2008 | Mrziglod et al. |
| 7,721,128 | B2 | 5/2010 | Johns et al. |
| 7,945,607 | B2 | 5/2011 | Hinds |
| 8,051,117 | B2 | 11/2011 | Lundvall et al. |
| 8,190,664 | B2 | 5/2012 | Lundvall et al. |
| 8,560,591 | B2 | 10/2013 | Lundvall et al. |
| 8,694,572 | B2 | 4/2014 | Samy et al. |
| 8,762,438 | B2 | 6/2014 | Lundvall et al. |
| 8,924,455 | B1 | 12/2014 | Barman et al. |
| 9,412,366 | B2 | 8/2016 | Wilensky et al. |
| 9,916,531 | B1 | 3/2018 | Zivkovic et al. |
| 10,187,568 | B1 | 1/2019 | Tran et al. |
| 10,224,954 | B1 | 3/2019 | Madduri et al. |
| 10,360,304 | B1 | 7/2019 | Alvarez et al. |
| 10,427,306 | B1 | 10/2019 | Quinlan et al. |
| 10,656,942 | B2 | 5/2020 | Madduri et al. |
| 10,929,744 | B2 | 2/2021 | Li et al. |
| 2002/0138714 | A1 | 9/2002 | Leibholz et al. |
| 2003/0065699 | A1 | 4/2003 | Burns |
| 2003/0167460 | A1 | 9/2003 | Desai et al. |
| 2005/0138327 | A1 | 6/2005 | Tabei |
| 2006/0161375 | A1 | 7/2006 | Duberstein et al. |
| 2007/0220076 | A1 | 9/2007 | Hinds |
| 2008/0148120 | A1 | 6/2008 | Seuring |
| 2009/0113186 | A1 | 4/2009 | Kato et al. |
| 2009/0125293 | A1 | 5/2009 | Lefurgy et al. |
| 2010/0073068 | A1 | 3/2010 | Cho et al. |
| 2011/0060587 | A1 | 3/2011 | Phillips et al. |
| 2011/0301777 | A1 | 12/2011 | Cox et al. |
| 2012/0316845 | A1 | 12/2012 | Grey et al. |
| 2013/0054110 | A1 | 2/2013 | Sata |
| 2013/0332610 | A1 | 12/2013 | Beveridge |
| 2014/0081625 | A1 | 3/2014 | Wilensky et al. |
| 2014/0164737 | A1 | 6/2014 | Collange et al. |
| 2014/0249814 | A1 | 9/2014 | Nakano et al. |
| 2015/0134581 | A1 | 5/2015 | Doeding et al. |
| 2015/0370303 | A1 | 12/2015 | Krishnaswamy et al. |
| 2016/0026231 | A1 | 1/2016 | Ignowski et al. |
| 2016/0054922 | A1 | 2/2016 | Awasthi et al. |
| 2016/0124710 | A1 | 5/2016 | Lutz et al. |
| 2016/0170866 | A1 | 6/2016 | Ioualalen et al. |
| 2016/0328645 | A1 | 11/2016 | Lin et al. |
| 2016/0328647 | A1 | 11/2016 | Lin et al. |
| 2017/0061279 | A1 | 3/2017 | Yang et al. |
| 2017/0090956 | A1 | 3/2017 | Linsky |
| 2017/0103022 | A1 | 4/2017 | Kreinin et al. |
| 2017/0142327 | A1 | 5/2017 | Bayani |
| 2017/0161604 | A1 | 6/2017 | Craddock et al. |
| 2017/0221176 | A1 | 8/2017 | Munteanu et al. |
| 2017/0257079 | A1 | 9/2017 | Jain et al. |
| 2017/0262959 | A1 | 9/2017 | Lee et al. |
| 2017/0316307 | A1 | 11/2017 | Koster et al. |
| 2017/0316312 | A1 | 11/2017 | Goyal et al. |
| 2017/0344882 | A1 | 11/2017 | Ambrose et al. |
| 2017/0353163 | A1 | 12/2017 | Gazneli et al. |
| 2017/0357530 | A1 | 12/2017 | Shih et al. |
| 2017/0357910 | A1 | 12/2017 | Sommer et al. |
| 2018/0046903 | A1 | 2/2018 | Yao et al. |
| 2018/0088996 | A1 | 3/2018 | Rossi et al. |
| 2018/0096243 | A1 | 4/2018 | Patil et al. |
| 2018/0157464 | A1 | 6/2018 | Utz et al. |
| 2018/0288440 | A1 | 10/2018 | Chao |
| 2018/0293517 | A1 | 10/2018 | Browne et al. |
| 2018/0300931 | A1 | 10/2018 | Vembu et al. |
| 2018/0322391 | A1 | 11/2018 | Wu et al. |
| 2018/0357541 | A1 | 12/2018 | Chen et al. |
| 2018/0367729 | A1 | 12/2018 | Parasnis et al. |
| 2018/0373976 | A1 | 12/2018 | Woo |
| 2019/0034784 | A1 | 1/2019 | Li et al. |
| 2019/0042244 | A1 | 2/2019 | Henry |
| 2019/0042925 | A1 | 2/2019 | Choe et al. |
| 2019/0050710 | A1 | 2/2019 | Wang et al. |
| 2019/0057696 | A1 | 2/2019 | Ogawa |
| 2019/0114142 | A1 | 4/2019 | Yoda et al. |
| 2019/0122094 | A1 | 4/2019 | Chen et al. |
| 2019/0122119 | A1 | 4/2019 | Husain |
| 2019/0138372 | A1 | 5/2019 | Tee |
| 2019/0164285 | A1 | 5/2019 | Nye et al. |
| 2019/0180170 | A1 | 6/2019 | Huang et al. |
| 2019/0199370 | A1 | 6/2019 | Madduri et al. |
| 2019/0205737 | A1 | 7/2019 | Bleiweiss et al. |
| 2019/0205746 | A1 | 7/2019 | Nurvitadhi et al. |
| 2019/0220734 | A1 | 7/2019 | Ferdman et al. |
| 2019/0228762 | A1 | 7/2019 | Wang et al. |
| 2019/0251429 | A1 | 8/2019 | Du et al. |
| 2019/0265949 | A1 | 8/2019 | Ito |
| 2019/0278677 | A1 | 9/2019 | Terechko et al. |
| 2019/0294968 | A1 | 9/2019 | Vantrease et al. |
| 2019/0339937 | A1 | 11/2019 | Lo et al. |
| 2020/0005424 | A1 | 1/2020 | Appu et al. |
| 2020/0044668 | A1 | 2/2020 | Liu |
| 2020/0050429 | A1 * | 2/2020 | Li ............................. G06F 7/52 |
| 2020/0097799 | A1 | 3/2020 | Pivakar et al. |
| 2020/0117453 | A1 | 4/2020 | Zhang et al. |
| 2020/0117614 | A1 | 4/2020 | Zhang et al. |
| 2020/0125508 | A1 | 4/2020 | Liu et al. |
| 2020/0126554 | A1 | 4/2020 | Chen et al. |
| 2020/0126555 | A1 | 4/2020 | Chen et al. |
| 2020/0142748 | A1 | 5/2020 | Liu et al. |
| 2020/0159527 | A1 | 5/2020 | Zhang et al. |
| 2020/0159530 | A1 | 5/2020 | Zhang et al. |
| 2020/0159531 | A1 | 5/2020 | Zhang et al. |
| 2020/0159532 | A1 | 5/2020 | Zhang et al. |
| 2020/0159533 | A1 | 5/2020 | Zhang et al. |
| 2020/0159534 | A1 | 5/2020 | Li et al. |
| 2020/0160162 | A1 | 5/2020 | Zhang et al. |
| 2020/0160163 | A1 | 5/2020 | Liu et al. |
| 2020/0160219 | A1 | 5/2020 | Zhang et al. |
| 2020/0160220 | A1 | 5/2020 | Zhang et al. |
| 2020/0160221 | A1 | 5/2020 | Zhang et al. |
| 2020/0160222 | A1 | 5/2020 | Zhang et al. |
| 2020/0168227 | A1 | 5/2020 | Chen et al. |
| 2020/0174547 | A1 | 6/2020 | Fang et al. |
| 2020/0183752 | A1 | 6/2020 | Liu et al. |
| 2020/0241874 | A1 | 7/2020 | Chen et al. |
| 2020/0257972 | A1 | 8/2020 | Miniskar et al. |
| 2020/0334041 | A1 | 10/2020 | Zhang et al. |
| 2020/0334522 | A1 | 10/2020 | Zhang et al. |
| 2020/0334572 | A1 | 10/2020 | Zhang et al. |
| 2020/0394522 | A1 | 12/2020 | Liu et al. |
| 2020/0394523 | A1 | 12/2020 | Liu et al. |
| 2021/0042889 | A1 | 2/2021 | Pei |
| 2021/0061028 | A1 | 3/2021 | Da Deppo et al. |
| 2021/0117768 | A1 | 4/2021 | Liu et al. |
| 2021/0117810 | A1 | 4/2021 | Liu |
| 2021/0182177 | A1 | 6/2021 | Su et al. |
| 2021/0264270 | A1 | 8/2021 | Liu et al. |
| 2021/0286688 | A1 | 9/2021 | Liu et al. |
| 2021/0334007 | A1 | 10/2021 | Liu et al. |
| 2021/0334137 | A1 | 10/2021 | Zhang et al. |
| 2021/0341989 | A1 | 11/2021 | Chen et al. |
| 2021/0374510 | A1 | 12/2021 | Liu et al. |
| 2021/0374511 | A1 | 12/2021 | Liu et al. |

FOREIGN PATENT DOCUMENTS

| | | | |
|---|---|---|---|
| CN | 1503958 | A | 6/2004 |
| CN | 1851668 | A | 10/2006 |
| CN | 101572829 | A | 11/2009 |
| CN | 102270042 | A | 12/2011 |
| CN | 102404673 | A | 4/2012 |
| CN | 102684701 | A | 9/2012 |

(56) References Cited

FOREIGN PATENT DOCUMENTS

| CN | 102761509 A | 10/2012 |
|---|---|---|
| CN | 102789413 A | 11/2012 |
| CN | 102903089 A | 1/2013 |
| CN | 102981854 A | 3/2013 |
| CN | 103152673 A | 6/2013 |
| CN | 104317525 A | 1/2015 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A | 6/2017 |
| CN | 106951587 A | 7/2017 |
| CN | 106951962 A | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107644254 A | 1/2018 |
| CN | 107688855 A | 2/2018 |
| CN | 107797913 A | 3/2018 |
| CN | 108053028 A | 5/2018 |
| CN | 104899641 A | 7/2018 |
| CN | 108337000 A | 7/2018 |
| CN | 108510067 A | 9/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 109800877 A | 5/2019 |
| CN | 109902745 | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2435906 A1 | 4/2012 |
| EP | 2 703 945 A2 | 3/2014 |
| EP | 3 106 997 A2 | 12/2016 |
| EP | 3 407 268 A1 | 11/2018 |
| JP | H03-075860 A | 8/1989 |
| JP | 2-205923 A | 8/1990 |
| JP | 2001109613 A | 4/2001 |
| JP | 2009-134433 A | 8/2012 |
| JP | 2013-514570 A | 4/2013 |
| JP | 2014-199464 A | 10/2014 |
| JP | 2015-176158 A | 10/2015 |
| JP | 2018-26114 A | 2/2018 |
| JP | 2019-519852 A | 7/2019 |
| JP | 2020507844 A | 3/2020 |
| WO | 2008/153194 A1 | 12/2008 |
| WO | 2016/186823 A1 | 11/2016 |
| WO | 2017/138220 A1 | 8/2017 |
| WO | 2017/185412 A1 | 11/2017 |

OTHER PUBLICATIONS

Serpanos, D et al., Architecture of Network Systems, Morgan Kaufmann (an imprint of Elsevier). (Year: 2011).*

Domke, D. E., "Plan Ahead for a Successful SoC-Based PCB Design", DesignSolution, Electronic Design. Nov. 7, 2013. (Year: 2013).*

Chen et al., "DianNao: A Small-Footprint High-Throughput Accelerator for Ubiquitous Machine-Learning, "ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen et al., "A Small-Footprint Accelerator for Large-Scale Neural Networks," ACM Transactions on Computer Systems (TOCS), vol. 33, Issue 2, May 1, 2015, Article No. 6, ACM, pp. 1-27, New York, NY, USA; available: https://dl.acm. Org/citation.cfm?id=2701417.

Chen, Y., et al., "DaDianNao: A Machine-Learning Supercomputer," MICRO-47 Proceedings of the 47th Annual IEEE ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66 , Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems, pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer- Aided Design of Integrated Circuits and Systems, vol. 36 , Issue: 2, Jun. 22, 2016, pp. 227-240; available: https://eeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; pp. 393-405, available: https://ieeexplore.ieee.org/document/7551409.

Zhang, S. et al., "Cambricon-X: An Accelerator for Sparse Neural Networks," Published in: 2016 49th Annual IEEE/ ACM International Symposium on Microarchitecture (MICRO), Taipei, Taiwan, Oct. 15, 2016; 12 pages, available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), pp. 1-32, XP080759895, DOI: 10.1109/JPROC. 2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA. 2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), 60 pages, XP055673941, Retrieved from the Internet: URL:https://tigerprints.clemson.edu/cgi/viewcontent.cgi?article=1634&context=all theses retrieved on Mar. 5, 2020].

(56)                    References Cited

OTHER PUBLICATIONS

Anonymous, "Control unit—Wikipedia", May 8, 2017 (May 8, 2017), 9 pages, XP055673879, Retrieved from the Internet: URL: https://web.archive.org/web/20170508110348/https://en.wikipedia.org/ wiki/Control unit [retrieved on Mar. 5, 2020].
European Patent Office, Extended European Search Report for European Application No. 19212749.6 dated Mar. 18, 2020, 6 pages.
European Patent Office, Extended European Search Report for European Application No. 19212750.4 dated Mar. 18, 2020, 5 pages.
European Patent Office, Extended European Search Report for European Application No. 19212751.2 dated Mar. 18, 2020, 7 pages.
European Patent Office, Extended European Search Report for European Application No. 19212752.0 dated Mar. 18, 2020, 6 pages.
European Patent Office, Extended European Search Report for European Application No. 19214004.4 dated Mar. 18, 2020, 5 pages.
European Patent Office, Extended European Search Report for European Application No. 19213389.0 dated Mar. 18, 2020, 5 pages.
European Patent Office, Extended European Search Report for European Application No. 19212753.8 dated Mar. 18, 2020, 7 pages.
European Patent Office, Extended European Search Report for European Application No. 19212754.6 dated Mar. 18, 2020, 6 pages.
European Patent Office, Extended European Search Report for European Application No. 19212755.3 dated Mar. 18, 2020, 6 pages.
Joel Emer et al., "DNN Accelerator Architectures", CICS/MTL Tutorial, Jan. 1, 2017 (Jan. 1, 2017), XP055672691, 74 pages. Retrieved from the Internet: URL:https://www.rle.mit.edu/eems/wp-content/uploads/2017/031Tutorial-on-JNN-4-of-5-DNN-Accelerator-Architectures.pdf [retrieved on Mar. 2, 2020].
Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].
European Patent Office, Extended European Search Report for European Application No. 19212756.1 dated Mar. 18, 2020, 7 pages.
European Patent Office, Extended European Search Report for European Application No. 18906652.6 dated Mar. 18, 2020, 5 pages.
European Patent Office, Extended European Search Report for European Application No. 19212746.2 dated Mar. 18, 2020, 8 pages.
Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.
Li et al., "Using Artificial Neural Network for Predicting Thread Partitioning in Speculative Multithreading", IEEE, 2015, pp. 823-826.
Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.
Pedro O. Domingos, et al., "An Efficient and Scalable Architecture for Neural Networks With Backpropagation Learning" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005. 1515704 ISBN: 978-0-7803-9362-2.
Extended European Search Report for Application No. 19215861.6 mailed May 15, 2020, 17 pages.
Extended European Search Report for Application No. 19215862.4 mailed May 15, 2020, 17 pages.
Sumina Yamashita, et al., "A Method to create illustrate images using DCGAN," JIJ SIG Technical Report, vol. 2017-MPS-112 No. 16, Feb. 27, 2017, 8 pages. (Translation of Abstract Included).
European Patent Office, Extended European Search Report for European Application No. 19218382.0 dated Apr. 24, 2020, 11 pages.
Yi Yang et al., "Deploy Large-Scale Deep Neural Networks in Resource Constrained Io T Devices with Local Quantization Region", arxiv.org, Cornell University Library, 201 Olin Library Cornell University Ithaca, NY 14853, May 24, 2018 (May 24, 2018), 8 pages, XP081234517.
Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].
Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/ MSPEC.2016.7524158 [retrieved on Jul. 27, 2016].
Song Mingcong et al., "In-Situ Al: Towards Autonomous and Incremental Deep Learning for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].
Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE. 2018.844167 4 [retrieved on Aug. 20, 2018].
Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].
European Patent Office, extended European search report for Application No. 19216754.2 mailed May 8, 2020, 8 pages.
Extended European Search Report for EP Application No. 19214324.6 mailed Oct. 1, 2020, 11 pages.
International Searching Authority, International Search Report for PCT Application No. PCT/CN2019/093144 mailed Oct. 9, 2019, 6 pages.
Communication pursuant to Article 94(3) EPC received for European Application No. 18861574.4, dated Jun. 2, 2022, 20 pages.
First Office Action (with English Translation) issued in counterpart corresponding Chinese Application No. 202010188335.6, on Dec. 31, 2024; 9 total pages.

* cited by examiner

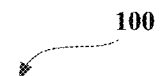
100
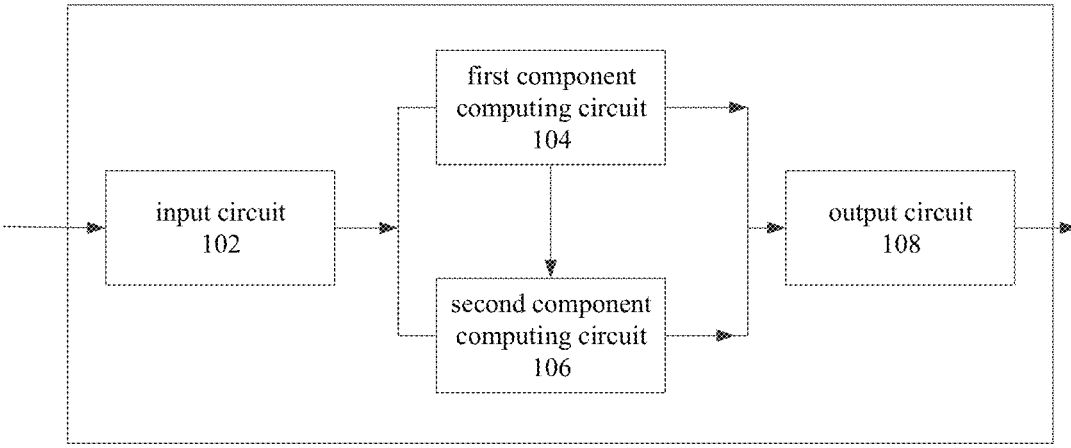
Fig. 1
200
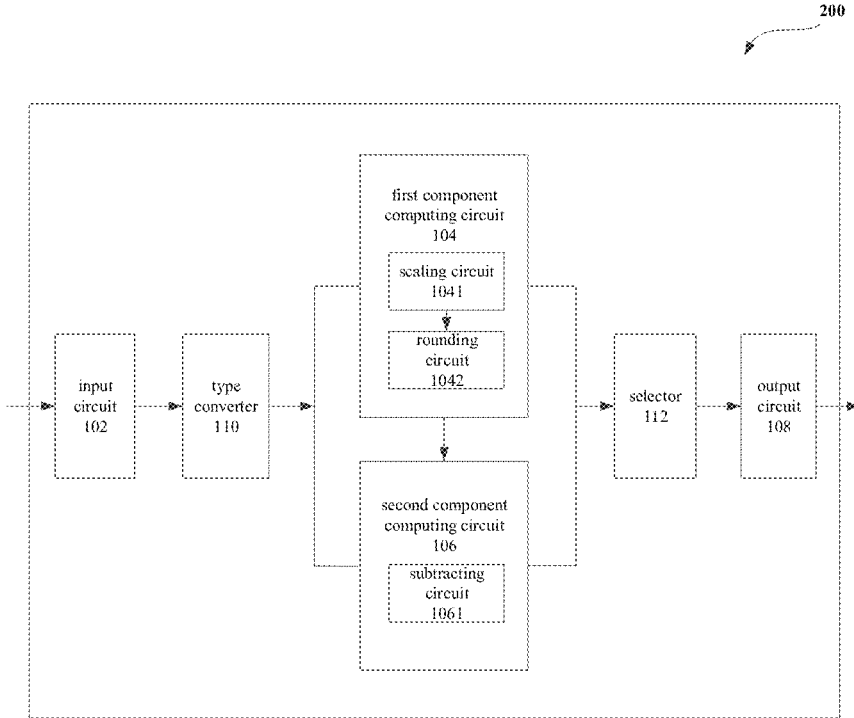
Fig. 2

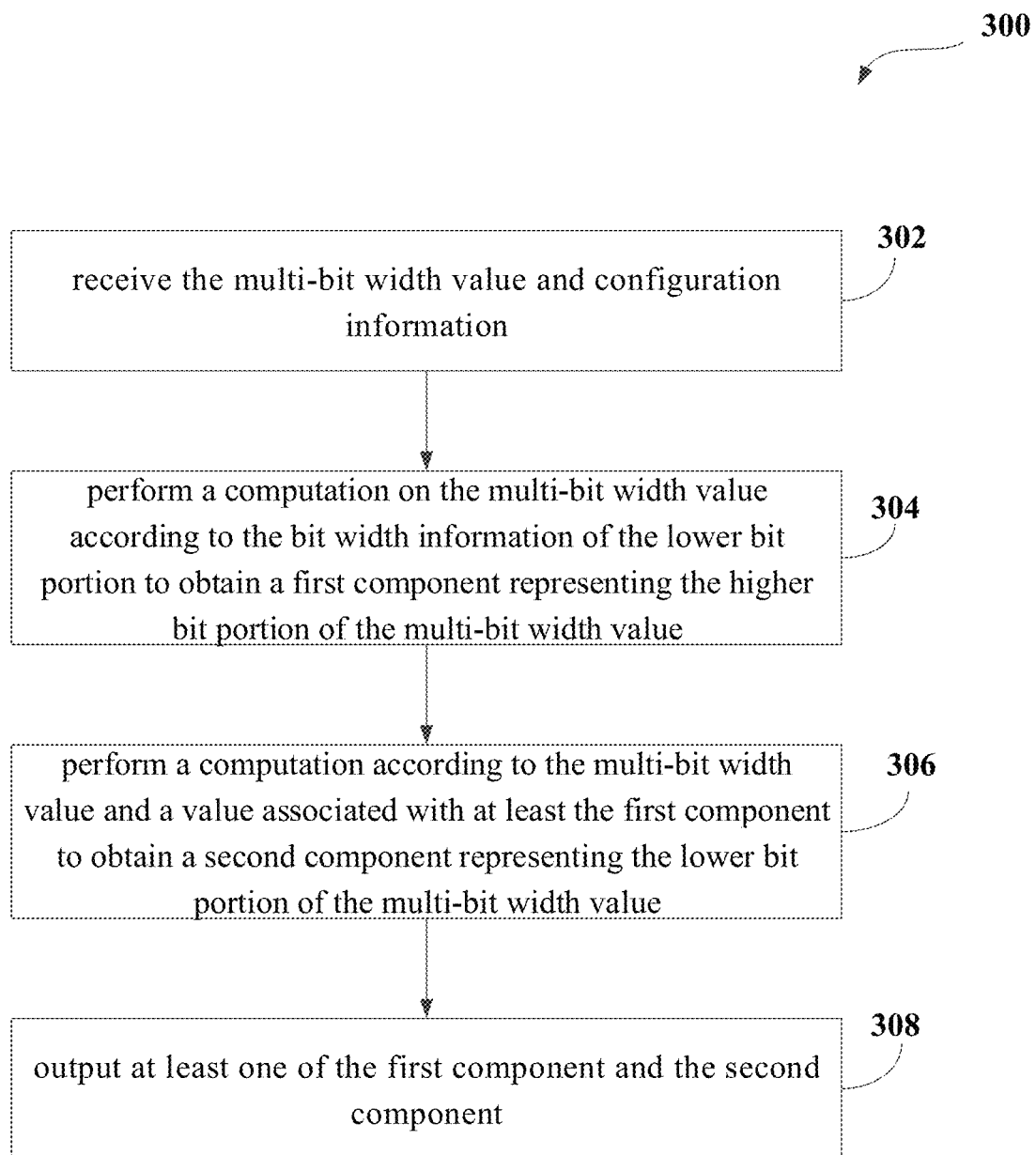

300

302 receive the multi-bit width value and configuration information

304 perform a computation on the multi-bit width value according to the bit width information of the lower bit portion to obtain a first component representing the higher bit portion of the multi-bit width value

306 perform a computation according to the multi-bit width value and a value associated with at least the first component to obtain a second component representing the lower bit portion of the multi-bit width value

308 output at least one of the first component and the second component

COMPUTING APPARATUS AND METHOD, BOARD CARD, AND COMPUTER READABLE STORAGE MEDIUM

CROSS-REFERENCE TO RELATED APPLICATIONS

This application is a continuation of International Application No PCT/CN2021/081189 filed on Mar. 16, 2021, that claims priority to the Chinese Application No. 202010188335.6 filed on Mar. 17, 2020, the disclosure of both being incorporated herein in its entirety by reference.

TECHNICAL FIELD

The present disclosure generally relates to data processing. More specifically, the present disclosure relates to a computing device and method for processing a multi-bit width value, an integrated circuit board card, and a computer readable storage medium.

BACKGROUND OF THE INVENTION

Currently, the data bit width processed by different types of processors may vary. For a processor performing computations on certain data types, the data bit width of the data processed is often limited. For example, a fixed point computation unit can typically process a data bit width of no more than 16 bits, e.g., 16 bits of integer data. However, in order to save the computing cost and overhead and improve the computing efficiency, how to enable a processor limited in bit width processing to process data of larger bit widths has become a technical problem to be solved.

SUMMARY OF THE INVENTION

To solve at least the technical problem as mentioned above, the present disclosure proposes, in various aspects, a solution for splitting multi-bit width data. With the splitting solution of the present disclosure, multi-bit width data may be split and expressed into at least two pieces of data with smaller bit widths, so that in the scenario where a processor is limited in bit width processing, the two pieces of data with smaller bit widths may be used in computing.

In a first aspect, the present disclosure provides a computing device for processing a multi-bit width value. The multi-bit width value includes a higher bit portion and a lower bit portion. The computing device includes: an input circuit configured to receive the multi-bit width value and configuration information, where the configuration information includes at least bit width information of the higher bit portion or the lower bit portion; a first component computing circuit configured to perform the computation on the multi-bit width value according to the bit width information of the lower bit portion to obtain a first component representing the higher bit portion of the multi-bit width value; a second component computing circuit configured to perform the computation according to the multi-bit width value and a value associated with at least the first component to obtain a second component representing the lower bit portion of the multi-bit width value; and an output circuit configured to output at least one of the first component and the second component.

In a second aspect, the present disclosure provides an integrated circuit chip, including the computing device as described above.

In a third aspect, the present disclosure provides an integrated circuit board card, including the integrated circuit chip as described above.

In a fourth aspect, the present disclosure provides a method for processing a multi-bit width value. The multi-bit width value includes a higher bit portion and a lower bit portion. The method includes: receiving the multi-bit width value and configuration information, where the configuration information includes at least bit width information of the higher bit portion or the lower bit portion; performing the computation on the multi-bit width value according to the bit width information of the lower bit portion to obtain a first component representing the higher bit portion of the multi-bit width value; performing the computation according to the multi-bit width value and a value associated with at least the first component to obtain a second component representing the lower bit portion of the multi-bit width value; and outputting at least one of the first component and the second component.

In a fifth aspect, the present disclosure provides a computing device for processing a multi-bit width value, including: a processor; and a memory storing program instructions which, when executed by the at least one processor, cause the computing device to perform the method as described above.

In a sixth aspect, the present disclosure provides a computer readable storage medium storing program instructions for processing a multi-bit width value to be used in a neural network operation. The program instructions, when executed by a processor, cause the aforementioned method to be performed.

By means of the computing device, the integrated circuit board card, the method and the computer readable storage medium as described above, based on the solution of the present disclosure, one multi-(or higher) bit width value can be split and expressed into a plurality of smaller (or lower) bit width values, so that in some artificial intelligence application scenarios including, for example, the neural network operation and the like, or other general scenarios, the computing capability of a processor can be fully utilized without being limited by the bit width processing limitation of the processor. Further, in some neural network operation scenarios requiring lower bit width values, the solution of the present disclosure can further simplify computing of the neural network by splitting and expressing the multi-bit width value into a plurality of lower bit-widths, thereby improving the computing efficiency.

BRIEF DESCRIPTION OF THE DRAWINGS

The above features of the present disclosure may be better understood, and its numerous objects, features, and advantages will become apparent to those skilled in the art in conjunction with the drawings. The drawings in the following description are merely some embodiments of the disclosure and, to one of ordinary skill in the art, other drawings may be derived from these drawings without any creative labor, in which:

FIG. 1 is a simplified block diagram of a computing device according to an embodiment of the present disclosure;

FIG. 2 is a detailed block diagram of a computing device according to an embodiment of the present disclosure;

FIG. 3 is a flowchart illustrating processing of a multi-bit width value according to an embodiment of the present disclosure;

3

Figure 4:
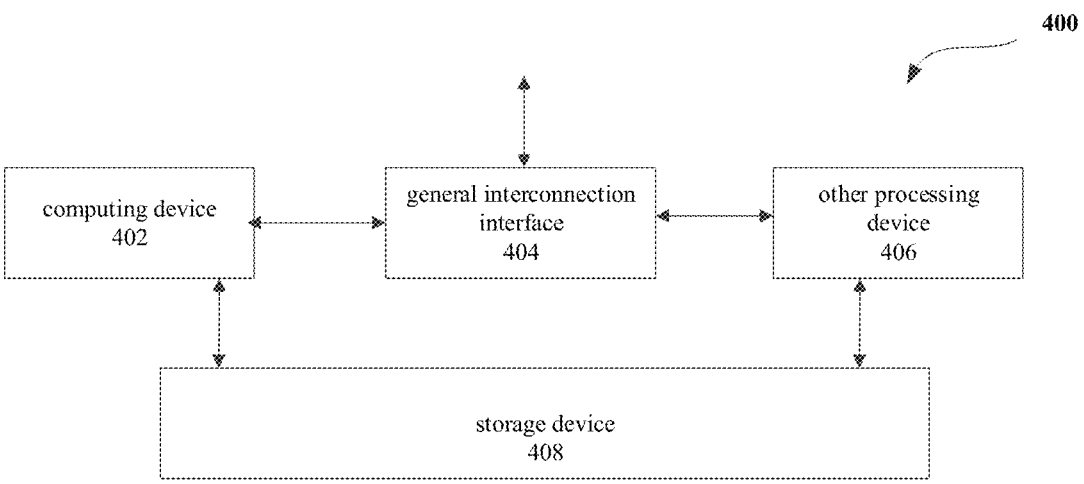
Figure 5:
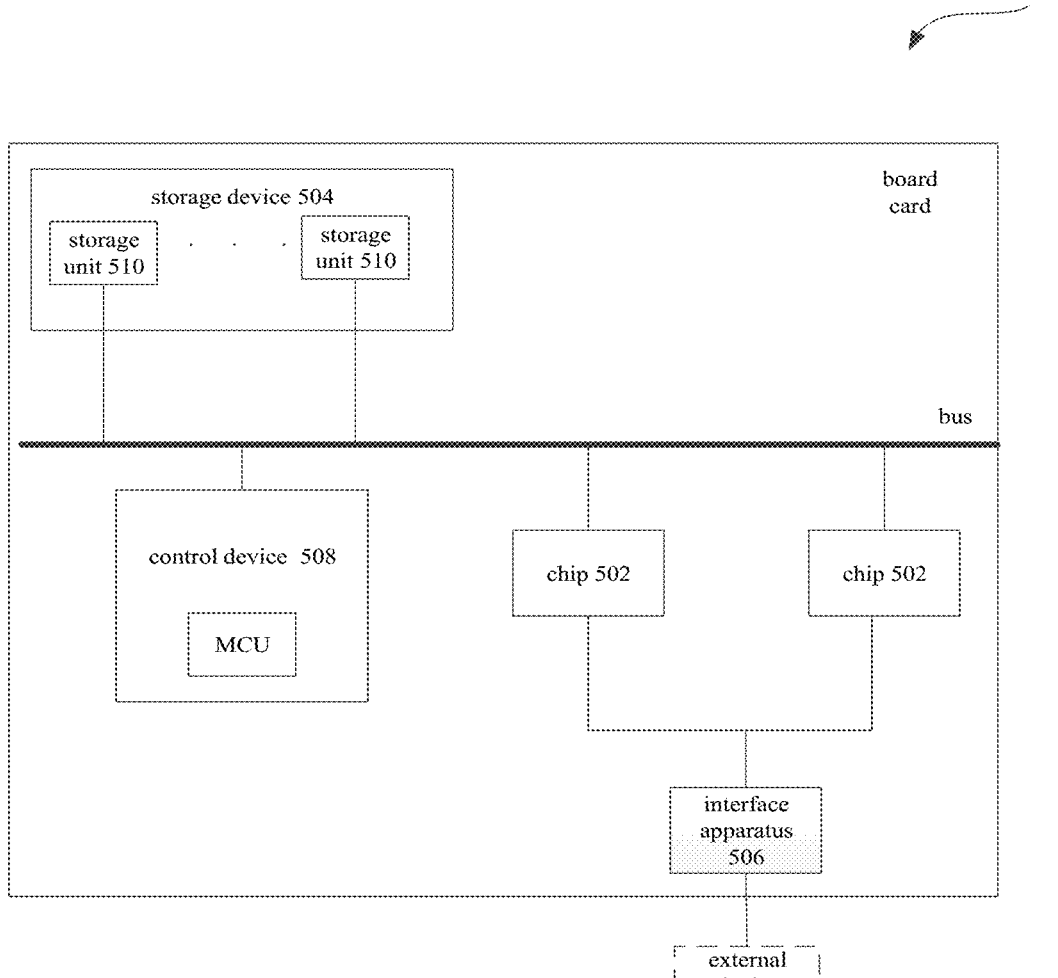

FIG. 4 is a structural diagram of a combined processing apparatus according to an embodiment of the present disclosure; and FIG. 5 is a schematic structural diagram of a board card according to an embodiment of the present disclosure.

DETAILED DESCRIPTION OF THE INVENTION

In the solution of the present disclosure, by expressing a multi-bit width (e.g., 24-bit) value with at least two lower-bit (e.g., 16-bit and 8-bit) width components, the obstacle of limited bit width of the processor may be overcome, the computing complexity may be simplified, and thereby the computing efficiency of may be improved, for example, a neural network operation. In one or more embodiments, a source or initial value may be split into a higher bit portion and a lower bit portion according to a bit distribution and configuration information of the input multi-bit width value, and a split operation may be performed on the higher bit portion and the lower bit portion to obtain a first component and a second component corresponding to the higher bit portion and the lower bit portion, respectively. Therefore, in the actual operation, at least one of the first component and the second component may be used in computing as a substitute to the source data. In other embodiments, the solution of the present disclosure can further break the source value into a plurality of components as desired according to the configuration information. For example, a similar split operation is repeated on at least one of the first component and the second component to obtain more than three components.

Hereinafter, embodiments of the present disclosure will be described in detail with reference to the accompanying drawings.

FIG. 1 is a simplified block diagram of a computing device 100 according to an embodiment of the present disclosure. In one or more embodiments, the computing device 100 may process a multi-bit width value for use in various application scenarios, such as artificial intelligence applications including neural network operation, or general scenarios which require splitting values for computing. Here, the multi-bit width value may include a higher bit portion and a lower bit portion, which are to be spilt into two or more components subsequently. In addition, the neural network operation may include various operations in training the neural network, such as weight update or gradient computing in a back propagation direction.

As shown in FIG. 1, the computing device 100 includes an input circuit 102 configured to receive the multi-bit width value and configuration information. The configuration information includes at least bit width information of the higher bit portion or the lower bit portion. For example, when the multi-bit width is an integer of 24 bits, the multi-bit width may be split into a higher bit portion of 8 bits and a lower bit portion of 16 bits. In other words, an 8-bit width component and a 16-bit width component will be obtained after the splitting. In one or more embodiments, the configuration information may further include information indicating whether the lower bit portion contains a sign bit. For example, when expressed in bits, "1" indicates that the lower bit portion contains a sign bit, and "0" indicates that the lower bit portion does not contain a sign bit. Additionally, the configuration information may further include significant bit information. For example, some bits of the multi-bit width value are forcibly specified as significant bits, so that the computation may be performed on the significant bits in subsequent split computation.

Connected to the input circuit 102 are a first component computing circuit 104 and a second component computing circuit 106. In one or more embodiments, the first component computing circuit may be configured to perform a computation on the multi-bit width value according to the bit width information of the lower bit portion to obtain a first component representing the higher bit portion of the multi-bit width value. In one scenario, the first component computing circuit may determine a scale factor according to the bit width information of the lower bit portion, and perform a computation on the multi-bit width value using the scale factor to obtain the first component. For example, when the bit width of the higher bit portion is n1 and the bit width of the lower bit portion is n2, the scale factor may be $2^{n2}$ when not considering the case where n2 contains a sign bit. In contrast, the scale factor may be $2^{n2-1}$ when considering the case where n2 contains a sign bit.

In one or more embodiments, the second component computing circuit may be configured to perform a computation according to the multi-bit width value and a value associated with at least the first component to obtain a second component representing the lower bit portion of the multi-bit width value. In one scenario, when the configuration information indicates the lower bit width portion not containing the sign bit, a value of the first component may be simply subtracted from the multi-bit width value to obtain the second component. Here, the value of the first component may be a product value of the first component and the scale factor. In another scenario, when the configuration information indicates the lower bit width portion containing the sign bit, the second component computing circuit may be configured to determine an adjustment value according to the bit width information of the lower bit portion, and perform a computation according to the multi-bit width value, the value associated with the first component, and the adjustment value to obtain the second component. It is understandable that in some scenarios, the configuration information may not include the sign bit information. In this case, by, for example, an initial default setting, the computing device of the present disclosure may be configured to directly perform a splitting operation containing or not containing the sign bit, instead of firstly determining whether to consider the sign bit based on the configuration information.

After obtaining the first component and the second component which may represent the multi-bit width value, the computing device of the present disclosure may further include an output circuit 108 which may be configured to output at least one of the first component and the second component. As described above, the first component and the second component output from the output circuit may be applied to various types of computation in the neural network that need to use data with lower bit widths, such as weight update and gradient computation in back propagation in the neural network training. In some application scenarios, the obtained first component and second component may be directly stored to replace the multi-bit width value for later use. In the scenario where the neural network uses a fixed point processor that supports a lower bit width to perform a fixed point computation, by using the first component and the second component of lower bit widths output from the output circuit in the fixed point computation by the fixed point processor, the fixed point processor gets rid of the limitation of not being capable of processing data with more or higher bit widths, the computing scenario of the fixed point processor is expanded, the computing is simplified, and therefore the computing efficiency is improved and the computing overhead is reduced.

FIG. 2 is a detailed block diagram of a computing device 200 according to an embodiment of the present disclosure. As can be seen from FIG. 2, the computing device 200 includes not only the input circuit 102, the first component circuit 104, the second component circuit 106, and the output circuit 108 of the computing device 100 in FIG. 1, a plurality of circuits included in the first and second component circuits, and additionally a plurality of other devices are further illustrated. Since the functions of the input circuit, the first and second component computing circuits, and the output circuit have been described in detail in conjunction with FIG. 1, detailed description will not be given below.

As shown in FIG. 2, the first component computing circuit 104 may include a scaling circuit 1041 and a rounding circuit 1042. In one embodiment, the scaling circuit may be implemented by a shift circuit which may be configured to shift the multi-bit width value according to the scale factor to complete the scaling. For example, when the scale factor is $2^{n2}$, shifting by the shift circuit means moving the multi-bit width value toward the higher bits by n2 bits. When the higher bits are on the left of the multi-bit width value and the lower bits are on the right, moving toward the higher bits by n2 bits means moving to the left by n2 bits. In a specific implementation aspect, the shift circuit here may be constructed by a multiplier. After the corresponding shift operation on the multi-bit width value, in one embodiment, the first component computing circuit further includes a rounding circuit 1042 which may be configured to round the shifted multi-bit width value to obtain the first component. Depending on different application scenarios, the rounding operation here may include various forms of rounding computations, such as rounding up, rounding down, rounding towards zero, and so on. By such a rounding operation, the first component associated with the higher bit portion of the multi-bit width value may be obtained.

In one or more embodiments, the second component computing circuit 106 may include a subtracting circuit 1061 configured to subtract the value associated with the first component and the adjustment value from the multi-bit width value to obtain the second component. In one scenario, the value of the first component here may be a product value of the first component and the scale factor, and the adjustment value is the resulted value containing the sign bit in the lower bit portion. By subtracting the product value and the adjustment value from the multi-bit width value by means of the subtracting circuit, the second component associated with the lower bit portion of the multi-bit width value is obtained.

Further shown in FIG. 2 is a type converter 110 coupled to the input circuit 102. The type converter 110 may be configured to convert input data into a data type that is the same as the multi-bit width value, in other words, a data type that is supported by the first and second component computing circuits. With the type converter provided, the computing device of the present disclosure may split data of a different type than the data type supported by the splitting operation. For example, when the computing device of the present disclosure supports splitting of a fixed point integer value, a floating point value received by the input circuit may be converted into fixed point integer data through the type converter to be split by the first and second component computing circuits.

To enable flexible output, the computing device 200 of the present disclosure may additionally include a selector 112 that may be configured to output at least one of the first component and the second component to the output circuit 108 for output. In one embodiment, the selector 112 may select to output the first component, the second component, or both, according to information about the input items included in the configuration information. Such selective output may have technical advantages in some application scenarios. For example, in a case where only the first component or the second component is required in the subsequent computation, the output circuit does not need to output both of components, thereby saving overhead in terms of output. In addition, when only the first component needs to be output, the computing device of the present disclosure may calculate and output only the first component, thereby further saving the computing overhead.

In one or more embodiments, the computing device of the present disclosure may be further configured to break a multi-bit width value into a plurality of components designated by a user or required by an algorithm. To this end, the configuration information may include information about the count of components. When the count of components is a positive integer greater than 2, the computing device of the present disclosure repeatedly executes the first component computing circuit and the second component computing circuit according to the configuration information, until components of the count are obtained. For example, for a 24-bit width value, when the configuration information indicates splitting the value into three components each having a bit width of 8 bits, the 24-bit width value may be split into an 8-bit width first component and a 16-bit width intermediate second component through the first component computing circuit and the second component computing circuit. Then, the obtained value of the 16-bit width intermediate second component is re-input into the first component computing circuit and the second component computing circuit to be further split into a second component of 8-bit width and a third component of 8-bit width.

FIG. 3 is a flowchart illustrating a method 300 for processing a multi-bit width value according to an embodiment of the present disclosure. As described above, according to the configuration information, the multi-bit width value here includes a higher bit portion and a lower bit portion. Through the processing of the method 300, the multi-bit width value may be split into at least a first component and a second component representing the multi-bit width value.

As shown in FIG. 3, at step 302, the method 300 includes receiving the multi-bit width value and the configuration information. The configuration information includes at least bit width information of the higher bit portion or the lower bit portion. With such configuration information, the method 300 may determine at least a bit width value corresponding to the first or second component to be split. Next, at step 304, a computation is performed on the multi-bit width value according to the bit width information of the lower bit portion to obtain a first component representing the higher bit portion of the multi-bit width value. In one embodiment, the method 300 may include determining a scale factor according to the bit width information of the lower bit portion; and performing a computation on the multi-bit width value using the scale factor to obtain the first component. In one scenario, the scale factor is determined according to sign information included in the configuration information regarding whether the lower bit portion contains a sign bit.

After the first component representing the higher bit portion is obtained from computing, the method 300 proceeds to step 306. At this step 306, the method 300 may include performing a computation according to the multi-bit width value and a value associated with at least the first component to obtain a second component representing the lower bit portion of the multi-bit width value. In one embodiment, when the sign information in the configuration information indicates that the lower bit portion contains a sign bit, the method 300 may further include determining an adjustment value according to a bit width of the lower bit portion; and performing a computation according to the multi-bit width value, the value associated with the first component, and the adjustment value to obtain the second component.

After obtaining the first component and the second component, the method 300 proceeds to step 308. Here, the method 300 may include outputting at least one of the first component and the second component. In one embodiment, the configuration information may be used to selectively output the first component, the second component, or both. In some embodiments, when the configuration information includes information about the count of the split components, the method 300 may include repeating the splitting operation according to the count of components in the configuration information, until the multi-bit width value is split into the desired count. For example, in one scenario, when the count of desired split components is a positive integer greater than 2, the method 300 may further include determining at least one of the first component and the second component according to configuration information, as a next new multi-bit width value to be processed. Next, the method 300 may include performing a computation step according to a higher bit portion and a lower bit portion of the new multi-bit width value to obtain a first component and a second component of the new multi-bit width value. To achieve the predetermined count of components, the method 300 may include repeating the determining step and the calculating step until components of the predetermined count are obtained.

The splitting operation performed by the computing device or method of the present disclosure will be described below from the perspective of mathematical computation, and the solution of the present disclosure and its implementation may be further understood by those skilled in the art through the following series of exemplary equations and splitting results of specific values. For simplicity of description, a multi-bit width value having a bit width of n0 is denoted as $I_0$ below, $I_1$ is the first component obtained after splitting, $I_2$ is the second component obtained after splitting, a higher bit portion of $I_0$ has a bit width of n1 and is represented by the first component $I_1$, and a lower bit portion of $I_0$ has a bit width of n2-bit and is represented by $I_2$, where n0=n1+n2.

First, the first component $I_1$ may be calculated by:

$$I_1=\text{floor}(I_0/2^{n2}) \tag{1}$$

where floor represents the floor function and $2^{n2}$ represents the scale factor. As described above, the scale factor is also related to whether the lower bit portion contains a sign bit. When the lower bit portion does not contain a sign bit, the scale factor here will be expressed differently (which will be described later).

Then, the second component $I_2$ may be calculated by:

$$I_2=I_0-I_1\times2^{n}-2^{n2-1} \tag{2}$$

It can be seen that the "$I_1\times2^{n2}$" in equation (2) is the value of the first component mentioned above. When $I_1$ is multiplied by the scale factor $2^{n2}$, it is equivalent to moving toward the higher bits by n2 bits, and "$2^{n2-1}$" in the equation is the adjustment value mentioned above. As described above, when the configuration information indicates that the lower bit portion contains a sign bit, the representation range of the value $I_2$ may be expanded by subtracting this adjustment value. In different splitting scenarios, n0, n1, and n2 in the equation may take different positive integer values, such as n0=24, n1=8, n2=16, or n0=32, n1=16, n2=16. Since the equation here contains the sign bit, the first and second components obtained from the above equations are more precise in expressing the multi-bit width value before splitting, and have less loss.

The above shows the case where the lower bit portion contains a sign bit, and a computing equation for the case where the lower bit portion does not contain a sign bit will be given below, where the signs have the same meaning as shown above.

First, the first component $I_1$ may be calculated by:

$$I_1=\text{floor}(I_0/2^{n2-1}) \tag{3}$$

As described above, since the sign bit in the lower bit portion is not contained in this case, the scale factor is represented here by $2^{n2-1}$, instead of the "$2^{n2}$" in equation (1).

Then, the second component $I_2$ may be calculated by:

$$I_2=I_0-I_1\times2^{n2-1} \tag{4}$$

It can be seen that since the sign bit is not contained, the equation (4) does not have the adjustment value "$2^{n2-1}$" as in equation (2). Further, the "$I_1\times2^{n2-1}$" here is the value of the first component.

In different splitting scenarios, n0, n1, and n2 in the equation may take different positive integer values, such as n0=24, n1=8, n2=16, or n0=32, n1=16, n2=16, or n0=25, n1=9, n2=16. In some splitting scenarios, n0, n1, and n2 may satisfy n0<=n1+n2, such as n0=25, n1=16, n2=16. In other words, a 25-bit width value is split into two 16-bit width components. For the first component and the second component calculated from the equations (1) and (2), as described above, since the sign bit is contained, the resulted first component and second component have less loss in expressing the multi-bit width value before splitting.

The split results for specific values are listed below in table (1) and table (2), where table (1) lists split results that contain sign bits, and table (2) lists split results that do not contain sign bits.

TABLE 1

| Multi-bit width value | 141309 (integer 24-bit width) | 141309 (integer 25-bit width) | 141309 (integer 25-bit width) |
|---|---|---|---|
| First component | 2 (integer 8 bits) | 2 (integer 9 bits) | 1 (integer 8 bits) |
| Second component | −22531 (integer 16 bits) | −22531 (integer 16 bits) | −55299 (integer 17 bits) |

TABLE 2

| Multi-bit width value | 141309 (integer 23-bit width) | 111309 (integer 18-bit width) |
|---|---|---|
| First component | 4 (integer 8 bits) | 217 (integer 9 bits) |
| Second component | 10237 (integer 16 bits) | 205 (integer 10 bits) |

FIG. 4 is a structural diagram of a combined processing apparatus 400 according to an embodiment of the present disclosure. The combined processing apparatus 400 as shown includes the above computing device 402 which may be configured to perform the splitting method as described above in conjunction with the drawings. In addition, the combined processing apparatus further includes a general interconnection interface 404, and an other processing device 406. The computing device 402 according to the present disclosure may interact with the other processing device 406 through the general interconnection interface 404 to jointly complete an operation specified by a user, such as splitting a multi-bit width value to obtain at least a first component and a second component.

According to the solution of the present disclosure, the other processing device may include one or more types of general and/or dedicated processors such as central processing units (CPUs), graphics processing units (GPUs), artificial intelligence processors, and the like, and the count of the other processing devices may not be limited, and may be determined according to actual needs. In one or more embodiments, the other processing device may serve as an interface between the computing device of the present disclosure (which may be embodied in a computing device associated with artificial intelligence such as a neural network operation) and external data and control to perform basic control including, but not limited to, data transfer, starting and stopping of the computing device, and the like; or the other processing device may cooperate with the computing device to perform computation tasks.

According to the solution of the present disclosure, the general interconnection interface may be configured to transmit data and control instructions between the computing device and the other processing device. For example, the computing device may obtain the input data to be split from the other processing device via the general interconnection interface, and write the input data into a storage device (or memory) on chip of the computing device. Further, the computing device may obtain control instructions from the other processing device via the general interconnection interface, and write the control instructions into a control cache on chip of the computing device. Alternatively, or optionally, the general interconnection interface may read data from a storage unit of the computing device and transmit the data to the other processing device.

Optionally, the combined processing apparatus may further include a storage device 408 that may be connected to the computing device and the other processing device, respectively. In one or more embodiments, the storage device may be configured to store data of the computing device and the other processing device, especially the data that cannot be stored entirely in the storage device inside or on chip of the computing device or the other processing device.

Depending on different application scenarios, the combined processing apparatus of the present disclosure may be used as a system on chip (SOC) of an apparatus such as a mobile phone, a robot, a drone, a video monitoring device or the like, which can effectively reduce a core area of the control part, improve the processing speed, and reduce the overall power consumption. In this case, the general interconnection interface of the combined processing apparatus may be connected to some component of the apparatus. The component may include, for example, a camera, a monitor, a mouse, a keyboard, a network card, or a wifi interface.

In some embodiments, the disclosure further provides a chip including the storage device or the combined processing apparatus as described above. In some other embodiments, the disclosure further provides a chip package structure including the chip as described above.

In some embodiments, the disclosure further provides a board card, including the chip package structure as described above. Referring to FIG. 5, the exemplary board card is provided, and the board card may further include, in addition to the chip 502, other associated components including but not limited to: a storage device 504, an interface apparatus 506, and a control device 508.

The storage device is connected to the chip inside the chip package structure via a bus to store data. The storage device may include a plurality sets of storage units 510. Each set of the storage units is connected to the chip via the bus. It is understandable that each set of the storage units may be double data rate SDRAMs (DDR SDRAMs).

DDR can multiply the speed of SDRAM without increasing the clock frequency. DDR allows data to be read out on a rising or falling edge of a clock pulse. DDR has a speed twice as fast as the speed of a standard SDRAM. In one embodiment, the storage device may include 4 sets of the storage units. Each set of the storage units may include a plurality of DDR4 pellets (chips). In one embodiment, the chip may internally include four 72-bit DDR4 controllers, where 64 bits of the 72 bits are used for data transmission, and 8 bits are used for ECC check.

In one embodiment, each set of the storage units may include a plurality of double rate synchronous dynamic random access memories arranged in parallel. DDR may perform data transmission twice within one clock period. A controller for DDR is provided in the chip and configured to control data transmission and storage of each storage unit.

The interface means is electrically connected to the chip in the chip package structure. The interface means is configured to enable data transmission between the chip and an external device 512, such as a server or a computer. For example, in one embodiment, the interface means may be a standard PCIE interface. In some examples, the data to be processed is transmitted from the server to the chip via the standard PCIE interface to implement data transfer. In another embodiment, the interface means may be another interface, and the disclosure does not limit the specific form of the interface as long as the interface means can implement a switching function. In addition, a computing result of the chip may be transmitted back to the external device (e.g., a server) through the interface means.

The control device is electrically connected to the chip. The control device is configured to monitor a state of the chip. Specifically, the chip and the control device may be electrically connected via an SPI interface. The control device may include a micro controller unit (MCU). In one or more embodiments, the chip may include a plurality of processing chips, a plurality of processing cores or a plurality of processing circuits, and may carry a plurality of loads. Therefore, the chip may be in different working states such as a multi-load state and a light load state. With the control apparatus, regulation and control of the working states of the plurality of processing chips, the plurality of processing cores and/or the plurality of processing circuits in the chip may be implemented.

In some embodiments, the disclosure further provides an electronic apparatus or device including the board card as described above. Depending on different application scenarios, the electronic apparatus or device may include a data processing device, a robot, a computer, a printer, a scanner, a tablet, a smart terminal, a cell phone, a drive recorder, a navigator, a sensor, a camera, a server, a cloud server, a video camera, a projector, a watch, headsets, a removable storage, a wearable device, vehicle, a household appliance, and/or a medical device. The vehicle may include an airplane, a ship, and/or an automobile; the household appliance may include a television, an air conditioner, a microwave oven, a refrigerator, an electric cooker, a humidifier, a washing machine, an electric lamp, a gas stove or a range hood; and the medical device may include a nuclear magnetic resonance instrument, a B ultrasonic scanner and/or an electrocardiograph.

It should be noted that for the sake of brevity, the foregoing method embodiments are all described as a series of combinations of actions, but those skilled in the art should understand that the present disclosure is not limited by the described order of actions, because according to the present disclosure, some steps may be performed in other orders or at the same time. In addition, those skilled in the art should also understand that the embodiments described in the description are all optional embodiments, and the acts and units involved are not necessarily required by the present disclosure.

In the above described embodiments, descriptions of the various embodiments are focused differently, and portions that are not detailed in certain embodiments may be referred to related descriptions in other embodiments.

In several embodiments provided in the present disclosure, it is understandable that the disclosed device may be implemented in other manners. For example, the device embodiments described above are merely illustrative. For example, the division of the units is merely one type of logical functional division, and other dividing manners may be adopted in practical implementations. For example, a plurality of units or components may be combined or integrated into another system, or some features may be omitted, or not executed. In addition, the shown or discussed mutual coupling or direct coupling or communicative connection may be an indirect coupling or communicative connection via some interfaces, devices or units, or may be in an electrical, optical, acoustic, magnetic or other form.

The units described as separate parts may or may not be physically separate, and parts displayed as units may or may not be physical units, may be located in one position, or may be distributed on a plurality of network units. Some or all of the units may be selected according to actual needs to achieve the purpose of the solution of the embodiment.

In addition, functional units in various embodiments of the present disclosure may be integrated into one processing unit, or each unit may be provided separately and physically, or two or more units may be integrated into one unit. The integrated unit as described above may be implemented in the form of hardware, or in the form of a software program unit.

The integrated unit, if implemented in the form of a software program unit and sold or used as a stand-alone product, may be stored in a computer readable memory. Based on such understanding, the technical solution of the present disclosure may be embodied in the form of a software product (such as a computer readable storage medium), which is stored in a memory and includes several instructions for causing a computer device (which may be a personal computer, a server, or a network device, etc.) to perform all or part of the steps of the method according to the embodiments of the present disclosure. The memory mentioned before includes: a U Disk, a read-only memory (ROM), a random access memory (RAM), a mobile hard disk, a disk or a compact disk, and other media that can store a program code.

In the above embodiments of the present disclosure, descriptions of the various embodiments are focused differently, and portions that are not detailed in certain embodiments may be referred to related descriptions in other embodiments. The technical features of the above embodiments may be arbitrarily combined. Not all possible combinations of the technical features in the above embodiments are described for the sake of brevity, but all these combinations shall be construed as being within the scope of the present disclosure as long as they are not contradictory.

The foregoing may be better understood in light of the following clauses:

Clause 1. A computing device for processing a multi-bit width value, wherein the multi-bit width value comprises a higher bit portion and a lower bit portion, and the computing device comprises: an input circuit configured to receive the multi-bit width value and configuration information, wherein the configuration information comprises at least bit width information of the higher bit portion or the lower bit portion; a first component computing circuit configured to perform a computation on the multi-bit width value according to the bit width information of the lower bit portion to obtain a first component representing the higher bit portion of the multi-bit width value; a second component computing circuit configured to perform a computation according to the multi-bit width value and a value associated with at least the first component to obtain the second component representing the lower bit portion of the multi-bit width value; and an output circuit configured to output at least one of the first component and the second component.

Clause 2. The computing device of clause 1, wherein during the computation on the multi-bit width value according to the bit width information of the lower bit portion, the first component computing circuit is configured to: determine a scale factor according to the bit width information of the lower bit portion; and perform a computation on the multi-bit width value using the scale factor to obtain the first component.

Clause 3. The computing device of clause 2, wherein the configuration information further includes sign information regarding whether the lower bit portion contains a sign bit, and the first component computing circuit is configured to determine the scale factor according to the sign information.

Clause 4. The computing device of any one of clauses 1 to 3, wherein the first component computing circuit further includes a scaling circuit and a rounding circuit, wherein the scaling circuit is configured to shift the multi-bit width value according to the scale factor, and the rounding circuit is configured to round the shifted multi-bit width value to obtain the first component.

Clause 5. The computing device of clause 3, wherein the sign information indicates that the lower bit portion contains a sign bit, and the second component computing circuit is configured to: determine an adjustment value according to the bit width information of the lower bit portion; and perform a computation according to the multi-bit width value, the value associated with the first component, and the adjustment value to obtain the second component.

Clause 6. The computing device of clause 5, wherein the second component computing circuit includes a subtracting circuit configured to subtract the value associated with the first component and the adjustment value from the multi-bit width value to obtain the second component.

Clause 7. The computing device of clause 1, further comprising a type converter configured to convert input data into a data type that is the same as the multi-bit width value.

Clause 8. The computing device of clause 1, further comprising a selector configured to select at least one of the first component and the second component to the output circuit according to the configuration information.

Clause 9. The computing device of any one of clauses 5 to 8, wherein the configuration information further includes information about the count of components, and when the count of components is a positive integer greater than 2, the computing device repeatedly executes the first component computing circuit and the second component computing circuit according to the configuration information, until components of the count are obtained.

Clause 10. An integrated circuit chip, comprising the computing device of any one of clauses 1 to 9.

Clause 11. An integrated circuit board card, comprising the integrated circuit chip of clause 10.

Clause 12. A method for processing a multi-bit width value, wherein the multi-bit width value comprises a higher bit portion and a lower bit portion, and the method comprises: receiving the multi-bit width value and configuration information, wherein the configuration information comprises at least bit width information of the higher bit portion or the lower bit portion; performing a computation on the multi-bit width value according to the bit width information of the lower bit portion to obtain a first component representing the higher bit portion of the multi-bit width value; performing a computation according to the multi-bit width value and a value associated with at least the first component to obtain a second component representing the lower bit portion of the multi-bit width value; and outputting at least one of the first component and the second component.

Clause 13. The method of clause 12, wherein during the computation on the multi-bit width value according to the bit width information of the lower bit portion, the method further includes: determining a scale factor according to the bit width information of the lower bit portion; and performing a computation on the multi-bit width value using the scale factor to obtain the first component.

Clause 14. The method of clause 13, wherein the configuration information further includes sign information regarding whether the lower bit portion contains a sign bit, and the method further includes determining the scale factor according to the sign information.

Clause 15. The method of clause 14, wherein the sign information indicates that the lower bit portion contains a sign bit, and the method further includes: determining an adjustment value according to the bit width information of the lower bit portion; and performing a computation according to the multi-bit width value, the value associated with the first component, and the adjustment value to obtain the second component.

Clause 16. The method of any one of clauses 12 to 15, wherein the configuration information further includes information about the count of components, and when the count of components is a positive integer greater than 2, the method further includes: determining at least one of the first component and the second component according to configuration information, as a next new multi-bit width value to be processed; performing a computation step according to a higher bit portion and a lower bit portion of the new multi-bit width value to obtain a first component and a second component of the new multi-bit width value; and repeating the determining step and the calculating step until components of the count are obtained.

Clause 17. A computing device for processing a multi-bit width value, comprising: a processor; and a memory storing program instructions which, when executed by the at least one processor, cause the computing device to perform the method of any one of clauses 12 to 16.

Clause 18. A computer readable storage medium storing program instructions for processing a multi-bit width value, wherein the program instructions, when executed by a processor, cause the method of any one of clauses 12 to 16 to be performed. The above is a detailed description of embodiments of the present disclosure. The principles and implementations of the present disclosure are set forth through specific examples herein, and the description of the above embodiments is merely intended to assist in understanding the method of the present disclosure and the core ideas of the method. At the same time, for those ordinary skilled in the art, there will be changes in the specific embodiments and application scopes based on the ideas of the present disclosure. In conclusion, the content of the description should not be construed as limiting the disclosure.

It should be understood that the terms "first", "second", "third", "fourth", and the like in the claims, description, and drawings of the present disclosure are used to distinguish between different objects, and are not intended to describe a particular order. The terms "includes" and "including", when used in the description and claims of the present disclosure, specify the presence of stated features, integers, steps, operations, elements, and/or components, but do not preclude the presence or addition of one or more other features, integers, steps, operations, elements, components, and/or groups thereof.

It is also to be understood that the terminology used in the description of the disclosure herein is for the purpose of describing specific embodiments only, and is not intended to be limiting of the disclosure. As used in the description and the claims of the disclosure, the singular forms "a", "an" and "the" are intended to include the plural forms as well, unless the context clearly indicates otherwise. It should be further understood that the term "and/or" as used in the description and claims of the disclosure refers to any and all possible combinations of one or more of the associated listed items and includes such combinations.

As used in the description and the claims, the term "if" may be interpreted contextually as "when" or "once", or "in response to determining", or "in response to detecting." Similarly, the phrase "if it is determined" or "if [the described condition or event] is detected" may be interpreted contextually as "upon determining" or "in response to determining" or "upon detecting [the described condition or event]" or "in response to detecting [the described condition or event]."

The above is a detailed description of embodiments of the present disclosure. The principles and implementations of the present disclosure are set forth through specific examples herein, and the description of the above embodiments is merely intended to assist in understanding the method of the present disclosure and the core ideas of the method. Meanwhile, any change or modification made by those skilled in the art based on the idea of the disclosure and the specific implementation and application scope of the disclosure will fall within the protection scope of the disclosure. In conclusion, the content of the description should not be construed as limiting the disclosure.

What is claimed is:

1. A computing device for processing a multi-bit width value for a fixed-point processor, wherein the fixed-point processor supports a lower bit width than a bit width of the multi-bit width value, the multi-bit width value comprises a higher bit portion and a lower bit portion, and the computing device comprises:

an input circuit configured to receive the multi-bit width value and configuration information, wherein the configuration information comprises at least bit width information of the higher bit portion or the lower bit portion;

a first component computing circuit configured to determine a scale factor according to the bit width information of the lower bit portion and perform a computation on the multi-bit width value using the scale factor to obtain a first component representing the higher bit portion of the multi-bit width value;

a second component computing circuit configured to perform a computation according to the multi-bit width value and a value associated with at least the first component to obtain a second component representing the lower bit portion of the multi-bit width value; and an output circuit configured to output, to the fixed-point processor, at least one of the first component or the second component to be used as a substitute of the multi-bit width value, wherein a bit width of the first component or a bit width of the second component is smaller than the bit width of the multi-bit width value.

2. The computing device of claim 1, wherein the configuration information further includes sign information regarding whether the lower bit portion contains a sign bit, and the first component computing circuit is configured to determine the scale factor according to the sign information.

3. The computing device of claim 1, wherein the first component computing circuit further includes a scaling circuit and a rounding circuit, wherein the scaling circuit is configured to shift the multi-bit width value according to the scale factor, and the rounding circuit is configured to round the shifted multi-bit width value to obtain the first component.

4. The computing device of claim 2, wherein the sign information indicates that the lower bit portion contains a sign bit, and the second component computing circuit is configured to:

determine an adjustment value according to the bit width information of the lower bit portion; and perform a computation according to the multi-bit width value, the value associated with the first component, and the adjustment value to obtain the second component.

5. The computing device of claim 4, wherein the second component computing circuit includes a subtracting circuit configured to subtract the value associated with the first component and the adjustment value from the multi-bit width value to obtain the second component.

6. The computing device of claim 1, further comprising a type converter configured to convert input data into a data type that is the same as the multi-bit width value.

7. The computing device of claim 1, further comprising a selector configured to select at least one of the first component and the second component to the output circuit according to the configuration information.

8. The computing device of claim 4, wherein the configuration information further includes information about a count of components, and when the count of components is a positive integer greater than 2, the computing device repeatedly executes the first component computing circuit and the second component computing circuit according to the configuration information, until components of the count are obtained.

9. An integrated circuit chip, comprising the computing device of claim 1.

10. An integrated circuit board card, comprising the integrated circuit chip of claim 9.

11. A method for processing a multi-bit width value, wherein the multi-bit width value comprises a higher bit portion and a lower bit portion, and the method comprises:

receiving the multi-bit width value and configuration information, wherein the configuration information comprises at least bit width information of the higher bit portion or the lower bit portion;

determine a scale factor according to the bit width information of the lower bit portion;

performing a computation on the multi-bit width value using the scale factor to obtain a first component representing the higher bit portion of the multi-bit width value;

performing a computation according to the multi-bit width value and a value associated with at least the first component to obtain a second component representing the lower bit portion of the multi-bit width value; and outputting, to a fixed pointer processor, at least one of the first component or the second component to be used as a substitute of the multi-bit width value, wherein the fixed-point processor supports a lower bit width than a bit width of the multi-bit width value, and a bit width of the first component or a bit width of the second component is smaller than the bit width of the multi-bit width value.

12. The method of claim 11, wherein the configuration information further includes sign information regarding whether the lower bit portion contains a sign bit, and the method further includes determining the scale factor according to the sign information.

13. The method of claim 12, wherein the sign information indicates that the lower bit portion contains a sign bit, and the method further includes:

determining an adjustment value according to the bit width information of the lower bit portion; and performing a computation according to the multi-bit width value, the value associated with the first component, and the adjustment value to obtain the second component.

14. The method of claim 11, wherein the configuration information further includes information about a count of components, and when the count of components is a positive integer greater than 2, the method further includes:

determining at least one of the first component and the second component according to configuration information, as a next new multi-bit width value to be processed;

performing a computation step according to a higher bit portion and a lower bit portion of the new multi-bit width value to obtain a first component and a second component of the new multi-bit width value; and repeating the determining step and the calculating step until components of the count are obtained.

15. A computing device for processing a multi-bit width value, comprising:

a processor; and a memory storing program instructions which, when executed by the at least one processor, cause the computing device to perform the method of claim 11.

16. A non-transitory computer readable storage medium storing program instructions for processing a multi-bit width value, wherein the program instructions, when executed by a processor, cause the method of claim 11 to be performed.

* * * * *